Nov. 8, 1932.  R. C. BRETT ET AL  1,886,938

PROCESS OF RECLAIMING LEAD

Filed Jan. 26, 1931

Inventors:
Roy Cuming Brett
James H. Doyle
By Wallace R. Lane, Atty.

Patented Nov. 8, 1932

1,886,938

UNITED STATES PATENT OFFICE

ROY CUMING BRETT, OF CLEVELAND HEIGHTS, OHIO, AND JAMES E. DOYLE, OF WEBB CITY, MISSOURI, ASSIGNORS TO THE EAGLE-PICHER LEAD COMPANY, OF CHICAGO, ILLINOIS, A CORPORATION OF OHIO

PROCESS OF RECLAIMING LEAD

Application filed January 26, 1931. Serial No. 511,138.

The present invention relates to a process for reclaiming lead, and more in particular to a novel continuous process of softening lead by removing impurities, and especially antimony, therefrom.

The present invention consists in a method of reclaiming and softening lead from impure lead and lead alloys as represented in various scrap, the most important of which is battery scrap comprising the positive and negative plates of a storage battery. When the number of automobiles which are equipped with storage batteries is considered, and it is realized that the life of the batteries is from one to two years, it will be readily seen that the amount of lead in the scrapped batteries is very great, and the reclaiming of this secondary supply is of the utmost importance. The present invention contemplates the provision of a continuous process for converting this impure lead into a reclaimed, relatively pure soft lead which can again be used in the production of active materials such as oxides and sulphates of lead for batteries, or in any other use where a substantially pure lead is desired and essential.

Among the objects of the invention is the provision of a method for the separation of soft or pure lead out of alloys and other compounds, lead oxides, etc., containing the same. These alloys, oxides, and/or other compounds, are generally in the form of scrap, pig, dross, skims, etc., and composed essentially of battery scrap containing hard lead, litharge, lead peroxide, lead sulphate, sponge lead, tin, arsenic and other metals, and possibly some sulphuric acid. The hard lead is normally derived from the grid or perforated plate of a battery, antimony or other metals having been added to give the requisite hardness and stability to the lead to prevent the plate from buckling or being readily damaged, pure lead being quite soft and pliable.

A further object of the invention is the provision of a continuous step by step method of separating lead from its impurities and particularly from its antimony content, and reclaiming the soft or pure lead.

A still further object of the invention is the provision of a furnace construction provided with a molten bath of pure lead upon which the battery scrap and other lead alloys, oxides, etc. are delivered. The litharge (PbO) and lead peroxide (PbO$_2$) in the battery scrap oxidize and remove the antimony in the lead-antimony alloy, by converting the antimony to a lead antimoniate slag such as (Pb$_2$Sb$_2$O$_7$), the litharge being thereby reduced to metallic soft lead (Pb).

Another object of the invention is the provision of a bridge wall for separating the furnace into an oxidizing chamber and a refining chamber, thus providing for the continuous separation of the slag or impurities from the refined lead, and of continuous discharge of the slag and of the refined lead. By reason of the bridge wall construction, no drosses, slags, fumes, vapors, etc., may pass from one chamber to the other.

A further object of the invention is the feeding of the battery scrap and/or other alloys directly onto the bath of molten pure metal and the proper impingement of a hot gas flame onto the surface of the molten metal bath, thus bringing heat and heated oxygen into direct and intimate contact with the battery scrap to create reactive temperatures for and to assist in the chemical reactions between the active material and metallic antimony in battery scrap to form lead, antimony oxides, and an antimoniate.

Further objects are to provide a method of maximum simplicity, efficiency, economy and ease of assembly and operation, and such further objects, advantages and capabilities as will later more fully appear, and are inherently possessed thereby.

The invention further resides in the combination of steps, construction and arrangement illustrated in the accompanying drawing, and where we have shown a preferred embodiment, it is to be understood that the same is susceptible of modification and change, and comprehends other details, arrangements of parts, methods, features and constructions, without departing from the spirit of our invention.

Referring to the drawing.

Figures 1, 2:
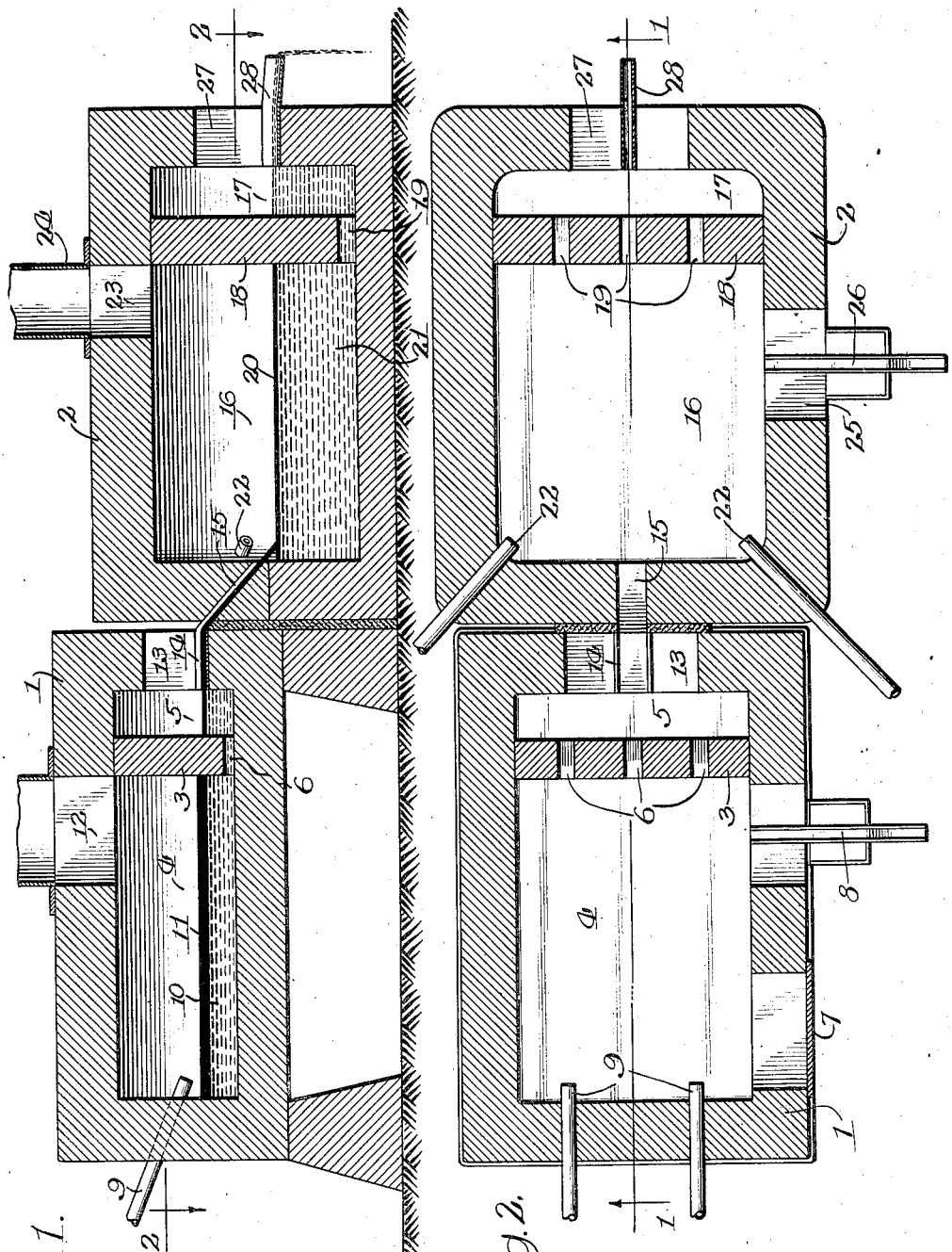
Fig. 1 is a view in vertical cross section of a furnace construction for carrying out the novel process, taken on line 1—1 of Fig. 2.
Fig. 2 is a view in horizontal cross section through the furnace construction, taken on line 2—2 of Fig. 1.

With reference to the disclosure in the drawing, the furnace construction includes furnaces 1 and 2 connected in series to allow for a further refinement of the reclaimed lead in the second furnace, it being understood that one or more furnaces may be provided, depending merely upon the necessary purity of the lead as it is finally discharged in a refined state. As shown, the furnace 1 is positioned at a higher level than the furnace 2 in order to permit a gravity feed and continuous flow of partially refined lead to the furnace 2. The interior of the furnace 1 is divided by a bridge wall 3 to provide an oxidizing chamber 4 and a refined lead chamber 5, the only access therebetween being by reason of openings 6. This bridge wall completely separates or provides a barrier between the chambers except for the openings 6 in the lowermost portion of the wall. The wall 3 prevents fumes or slag collecting in the oxidizing chamber from entering the refined lead chamber, since antimony combines readily with lead to form hard lead or an alloy of lead whenever same come into intimate contact.

A charging door 7 is located in a side wall of the furnace for admission of the battery scrap and/or other lead alloys, oxides, compounds, etc., and adjacent thereto is provided an opening having a slag discharge 8. Adjacent the door are gas burners 9, two being shown in the present disclosure, although any number may be used as desired. These burners are downwardly inclined so that their nozzles discharge the hot gas flame on the surface of a molten lead bath 10. This lead bath is of pure lead (Pb) and of suitable depth. After the surface of the lead bath 10 in the oxidizing chamber 4 has been raised to a temperature range of from 1200° F. to 2000° F., the battery scrap and/or other lead alloys, oxides, compounds, etc., forming the charge, are fed onto the surface of the lead bath 10 directly in the path of the impinging flames from the gas burners 9. This charge soon becomes molten at temperatures of sufficient intensity to prevent the metallic antimony therein from diffusing through the soft lead bath 10 and permitting quick and effective conversion of the metallic antimony to oxides and lead antimoniate. One of the reactions is as follows:

$7PbO + 2Sb = Pb_2Sb_2O_7 + 5Pb.$

The fumes collecting in the oxidizing chamber pass or are drawn through the outlet 12 and a trail, and from there to bag houses, these fumes being condensed and collected in bag houses as a by-product.

In a side wall of the furnace 1 is provided an opening 13 having a lead discharge 14 for discharging the refined lead from the refining chamber 5, through a gravity feed 15 into the interior of the second furnace 2. The interior of this furnace 2 is likewise divided into two compartments, an oxidizing chamber 16 and a refining chamber 17 separated by a bridge wall 18 having openings 19 in the lowermost part thereof. The oxidizing chamber 16 receives the lead overflow from the furnace 1, the impure lead 20 on the top of the lead bath 21, being raised to a temperature of sufficient intensity by means of gas burners 22 in order that substantially complete oxidation of the antimony and/or other impurities shall take place.

The openings 19 in the bridge wall 18 are the only outlets for the molten metal from the compartment or oxidizing chamber 16, there being however, an outlet 23 for gaseous or volatile constituents which pass upwardly through this outlet and through a stack 24, to trails and bag houses (not shown). An opening 25 in the front or side wall of the furnace 2 permits a continuous discharge of antimonial slag from the surface of the lead bath 21, through a gravity discharge 26. An opening 27 in a side wall of the furnace is provided with a lead discharging outlet 28 for continuously discharging the refined or reclaimed pure lead.

The discharge nozzles of the gas burners 22 are in close proximity to the bed of metal in the oxidizing chamber 16, and project a flame downwardly on this bed thereby keeping the inflowing metal at a high temperature, as likewise keeping the metal in the compartment or chamber 16 at a degree of temperature sufficient to allow for separation of the impurities from the pure metal, which in the present embodiment is lead.

In the operation of the furnace, an initial bed of relatively pure lead is placed in both the furnaces 1 and 2, the depth of bath being disclosed as greater in the furnace 2, although this may be varied. In fact, favorable results have been accomplished by the formation of the lead bath by the oxidation of the impure lead which is to be reclaimed. The depth of pure lead is such as to prevent any overflow of the pure metal through the slag overflow or outlet in the furnaces 1 and 2. The gas burners having their discharge outlets or nozzles adjacent the bed of the material in the furnaces, will maintain this bed in a molten state at a sufficiently high temperature. The impure metal from which it is desired to reclaim the relatively pure lead, and which consists essentially of battery scrap, lead oxides, alloys, compounds, etc., is then fed into the furnace 1 in the form of scrap, pig, dross, skims, etc., directly onto the surface of the bath of molten pure lead. When this scrap or the like contacts the bath of relatively pure lead, the same is almost instantaneously melted by reason of the high temperature existing in the oxidizing chamber 4. The active molten material in the battery scrap instantaneously reacts with the antimony in the molten antimonial lead in the battery scrap to form lead, antimony oxides, and lead antimoniate by means of the conversion of lead peroxide, lead oxide, and lead sulphate contained therein to lead, oxygen, and sulphur oxides. The resultant slag is continuously discharged by gravity from the surface of the molten metal bath. The relatively pure metal being of greater specific gravity than the slag, will gravitate in the bath in both the furnaces 1 and 2, and is thus readily separated through the openings in the base of the bridge walls into the refining chambers.

Since antimony combines readily with lead to form hard lead or an alloy of lead, it is essential that the brick wall completely separates the oxidizing chamber from the refining chamber above the metal bath, so as to prevent fumes and slag from the oxidizing chamber coming into intimate contact with the refined lead in the refining chamber.

Another important feature of the present invention is the fact that the lead bath in both the furnaces 1 and 2 and the film of impure metal on the surface of the baths, is at no time agitated other than by the current of the natural flow of the material, so as to prevent any possible chance of the antimony in the molten hard lead, flowing on the surface of the soft lead, from diffusing through the bath of the molten soft lead.

Although the invention has been described as pertaining to the reclaiming of relatively pure lead, it is to be understood that the method or means employed may be adapted for the reclaiming of various metals and by-products. It is also to be understood that although the disclosure particularly refers to the employment of an initial bath of pure lead, the bath of pure lead may be formed from the battery scrap, alloy, oxides, and various lead compounds from which the lead is to be reclaimed.

Having thus disclosed our invention, we claim:

1. The process of separating lead from lead oxides containing antimony and other metals, comprising the steps of melting said oxides over a lead bath whereby to oxidize said antimony to form, with lead oxides, an antimoniate slag, maintaining said bath and oxides in a quiescent state and continuously removing the relatively pure lead and the antimoniate slag by gravity.

2. The step by step process of separating lead from lead oxides containing antimony and other metals, comprising the steps of melting the oxides whereby to oxidize said antimony to form, with lead oxides, an antimoniate slag, continuously withdrawing the relatively pure lead and slag, oxidizing the antimony remaining in the partially refined lead, and separating the oxidized antimony from the reclaimed lead.

3. The step by step process of separating lead from lead oxides containing antimony, and other metals, comprising the steps of melting the oxides over a lead bath whereby to oxidize said antimony to form, with lead oxides, an antimoniate slag, continuously withdrawing the relatively pure lead and slag, feeding the relatively pure lead to a second lead bath, oxidizing the antimony remaining in the initially refined lead, and separating the oxidized antimony from the reclaimed lead.

4. The process of separating soft metallic lead from lead oxides and alloys containing antimony and other metals including battery scrap from storage batteries, comprising the steps of providing a bath of metallic lead, heating and maintaining said bath in a molten state, charging the lead oxides and alloys direct to the surface of the molten bath whereby to oxidize the antimony in said lead oxides and alloys and separate the same therefrom, maintaining said bath in a quiescent state to permit the separated reclaimed lead to gravitate in the bath, and continuously discharging the separated antimoniate slag from the top or surface of the bath, and the reclaimed lead from the bottom of the bath.

5. The process of separating lead from battery scrap containing lead peroxide and litharge and including antimony and other metals, comprising the steps of charging said battery scrap direct into a furnace, melting said scrap whereby to reduce said lead peroxide to litharge and oxygen and oxidize the antimony to form, with lead oxides, lead antimoniate slag, maintaining said materials in a quiescent state except for the natural flow thereof, and continuously separating the reclaimed lead and slag.

6. The process of separating lead from battery scrap containing lead peroxide and litharge and including antimony and other metals, comprising providing a bath of molten lead, charging the battery scrap onto the surface of the molten bath, maintaining the temperature of said bath at sufficient intensity to melt the charged scrap whereby to reduce the lead peroxide to litharge and oxygen and oxidize the antimony to form, with lead oxides, lead antimoniate slag, maintaining the bath in a quiescent state to permit gravitation of the reclaimed lead through the bath, and discharging the reclaimed lead from the bottom of said bath.

7. The process of separating lead from battery scrap containing lead peroxide and litharge and including antimony and other metals, comprising providing a bath of molten lead, charging the battery scrap onto the surface of the molten bath, maintaining the temperature of said bath at sufficient intensity to melt the charged scrap whereby to reduce the lead peroxide to litharge and oxygen and oxidize the antimony to form, with lead oxides, lead antimoniate slag, maintaining the bath in a quiescent state to permit a gravitation of the reclaimed lead through the bath, and continuously discharging the slag from the top or surface of the bath and the reclaimed lead from the bottom of said bath.

8. The process of separating lead from battery scrap containing lead peroxide and litharge and including antimony and other metals, comprising providing a bath of molten lead, charging the battery scrap onto the surface of the molten bath, maintaining the temperature of said bath at sufficient intensity to melt the charged scrap whereby to reduce the lead peroxide to litharge and oxygen and oxidize the antimony to form, with lead oxides, lead antimoniate slag, maintaining the bath in a quiescent state to permit a gravitation of the reclaimed lead through the bath, withdrawing fumes and gases from above said bath and collecting the same, and continuously discharging the slag from the top or surface of the bath and the reclaimed lead from the bottom of said bath.

In witness whereof, we hereunto subscribe our names to this specification.

ROY CUMING BRETT.
JAMES E. DOYLE.